United States Patent [19]
Boies et al.

[11] Patent Number: 5,426,732
[45] Date of Patent: Jun. 20, 1995

[54] METHOD AND APPARATUS FOR USER CONTROL BY DERIVING NEXT STATES OF A PROCESS FROM A CURRENT STATE AND BY PROVIDING A VISUAL PRESENTATION OF THE DERIVED NEXT STATES

[75] Inventors: Stephen J. Boies, Mahopac; Liam D. Comerford, Carmel; John D. Gould, Yorktown Heights; Susan L. Spraragen, Ossining; Jacob P. Ukelson, Bronx, all of N.Y.

[73] Assignee: International Business Machines Corporation, Armonk, N.Y.

[21] Appl. No.: 320,891

[22] Filed: Oct. 5, 1994

Related U.S. Application Data

[63] Continuation of Ser. No. 870,503, Apr. 17, 1992.

[51] Int. Cl.⁶ ............................................. G06F 19/00
[52] U.S. Cl. .................................................... 395/161
[58] Field of Search ............... 395/155, 156, 159, 160, 395/161; 364/188, 190, 474.22, 474.27, 578; 345/121

[56] References Cited

U.S. PATENT DOCUMENTS

| | | | |
|---|---|---|---|
| 3,911,215 | 10/1975 | Hurst et al. | 178/18 |
| 4,085,438 | 4/1978 | Butler | 364/107 |
| 4,220,815 | 9/1980 | Gibson et al. | 178/18 |
| 4,479,197 | 10/1984 | Haag et al. | 364/900 |
| 4,649,499 | 3/1987 | Sutton et al. | 364/518 |
| 4,763,356 | 8/1988 | Day, Jr. et al. | 379/368 |
| 4,802,116 | 1/1989 | Ward et al. | 364/900 |
| 4,803,039 | 2/1989 | Impink, Jr. et al. | 364/188 |
| 4,815,014 | 3/1989 | Lipner et al. | 364/188 |
| 4,823,283 | 4/1989 | Diehm et al. | 364/518 |
| 4,831,548 | 5/1989 | Matoba et al. | 364/188 |
| 4,833,592 | 5/1989 | Yamanaka | 364/138 |
| 4,847,604 | 7/1989 | Doyle | 345/180 |
| 4,853,498 | 8/1989 | Meadows et al. | 178/19 |
| 4,868,912 | 9/1989 | Doering | 345/175 |
| 4,873,623 | 10/1989 | Lane et al. | 364/188 |
| 4,903,012 | 2/1990 | Ohuchi | 345/178 |
| 4,910,504 | 3/1990 | Eriksson | 345/174 |
| 4,914,624 | 4/1990 | Dunthorn | 395/275 |
| 4,929,934 | 5/1990 | Ueda et al. | 345/174 |
| 4,929,935 | 5/1990 | Rysavy et al. | 345/178 |
| 4,931,018 | 6/1990 | Herbst et al. | 434/234 |

(List continued on next page.)

OTHER PUBLICATIONS

Townsend et al., "Distribution Management Systems", 3rd International Conference on Power Systems Monitoring and Control (1991), pp. 103-108.

Feddema et al., "Adaptive Image Feature Prediction and Control for Visual Tracking with a Moving Camera", 1990 IEEE International Conference on Systems, Man, and Cybernetics, pp. 20-24.

Krotkov et al., "An Agile Stereo Camera System for Flexible Image Acquisition", IEEE Journal of Robotics and Automation, vol. 4 No. 1 (Feb. 1988) pp. 108-113.

*Primary Examiner*—Mark K. Zimmerman
*Assistant Examiner*—N. Kenneth Burraston
*Attorney, Agent, or Firm*—Perman & Green

[57] ABSTRACT

A user interface includes a process model unit (34) for predicting one or more allowable next states, from a current state of a process, and a display processing unit (26) for deriving, for each of the allowable next states, a representation of the allowable next state. The display processing unit has an output coupled to a display screen (30) for displaying each of the representations (30b–30g) in conjunction with a representation (30a) of a current state of the process. The user interface further includes an actuator control unit (22) that is coupled to an input mechanism whereby a user selects one of the displayed representations of one of the allowable next states. The motor control unit controls the process to cause it to enter a new current state that corresponds to the selected derived representation. In one embodiment, the display screen has a touchscreen capability whereby the user selects one of the representations by physically touching the display screen within an area associated with a selected one of the derived allowable states.

37 Claims, 6 Drawing Sheets

U.S. PATENT DOCUMENTS

| | | | |
|---|---|---|---|
| 4,954,967 | 9/1990 | Takahashi | 345/173 |
| 4,957,690 | 9/1990 | Fennern | 364/188 |
| 4,967,190 | 10/1990 | Fujisaki et al. | 345/112 |
| 4,980,646 | 12/1990 | Zemel | 324/716 |
| 4,988,982 | 1/1991 | Rayner et al. | 345/173 |
| 5,003,505 | 3/1991 | McClelland | 345/173 |
| 5,016,008 | 5/1991 | Gruaz et al. | 341/33 |
| 5,027,279 | 6/1991 | Gottlieb et al. | 364/188 |
| 5,038,142 | 8/1991 | Flowers et al. | 341/34 |
| 5,051,912 | 9/1991 | Johanson et al. | 364/474.22 |
| 5,053,758 | 10/1991 | Cornett et al. | 345/174 |
| 5,055,840 | 10/1991 | Bartlett | 341/31 |
| 5,117,285 | 5/1992 | Nelson et al. | 348/20 |
| 5,121,318 | 6/1992 | Lipner et al. | 364/188 |
| 5,121,319 | 6/1992 | Fath et al. | 364/188 |
| 5,123,088 | 6/1992 | Kasahara et al. | 395/159 |
| 5,185,628 | 2/1993 | Wilson et al. | 364/188 |
| 5,191,645 | 3/1993 | Carclucci et al. | 395/159 |
| 5,202,726 | 4/1993 | McCulley et al. | 364/188 |
| 5,208,903 | 5/1993 | Curry | 395/131 |
| 5,224,053 | 6/1993 | Cook | 364/188 |
| 5,274,574 | 12/1993 | Tsujido et al. | 364/551.02 |
| 5,276,789 | 1/1994 | Besaw et al. | 395/140 |
| 5,309,369 | 5/1994 | Kamiguchi et al. | 364/188 |

FIG. 3 DISPLAY PROCESSING UNIT, 26

FIG. 4
PROCESS MODEL UNIT, 34

FIG. 5
MOTOR CONTROL UNIT, 22

FIG. 6

METHOD AND APPARATUS FOR USER CONTROL BY DERIVING NEXT STATES OF A PROCESS FROM A CURRENT STATE AND BY PROVIDING A VISUAL PRESENTATION OF THE DERIVED NEXT STATES

This is a continuation of copending application Serial Number 07/870,503, filed on Apr. 17, 1992.

FIELD OF THE INVENTION

This invention relates generally to process control systems and, in particular, to process control systems that provide a user interface for displaying information related to a controlled process and that receive input from a user of the system.

BACKGROUND OF THE INVENTION

A process control system may include a digital data processor that includes actuators for controlling a process, and a graphical display device for displaying process-related information to an operator. The system may also include one or more operator input devices for receiving input from the operator of the system. The display may graphically illustrate a current state of the process being controlled, and may also provide a list of one or more state variables for control by the operator. Examples include, but are not limited to, an environmental control system for a large building, a control system for a pharmaceutical manufacturing process, a petrochemical refining process, a control system for an automated manufacturing operation, and a control system for imaging or photographic devices.

In general, in known types of systems the operator is restricted to attempting to reach an alternate state by trial and error manipulation of some system variables. By example, in an environmental control system the operator may be enabled to vary the hot air flow to a selected zone of a building. However, the use of trial and error methods may not always provide an optimum environmental solution.

Furthermore, the use of preprogrammed, or accessed, next system states may not always provide an optimum solution to a particular process control problem.

For either the trial and error approach, or the preprogrammed approach, the operator may not be sufficiently aware of a consequence of a particular next state upon the controlled system so as to make an informed decision as to an appropriate next state, based on a current state of the system.

Known systems typically provide graphical representations of objects, and provide means for implementing "controls" on these objects to obtain a desired behavior. As an example, in U.S. Pat. No. 4,649,499, issued Mar. 10, 1987, entitled "Touchscreen Two-Dimensional Emulation of Three-Dimensional Objects" J. Sutton et al. described the use of a touchscreen to emulate three-dimensional objects on a two-dimensional computer screen. The system is employed to emulate the operation of a desktop rotary card file and a hand held calculator. In the calculator embodiment an image of a calculator is displayed and an operator touches the displayed "keys" to operate the calculator. What is not disclosed is the generation and display of derived (potential) next states of a process, in conjunction with a current state of the process, or the ability to enable a user to select one of a plurality of derived next states to become a next current state.

It is thus an object of this invention to provide a process control system user interface that derives one or more next states of a system based upon a current state of the system and upon a computational model of the system, and which furthermore provides a visual display of the one or more derived next states in conjunction with a visual display of the current state.

It is a further object of this invention to provide a process control system user interface that derives one or more next states of a system based upon a current state of the system and upon a computational model of the system, which provides a visual display of the one or more derived next states and a visual display of the current state, and which drives the system to a next state in response to the operator selecting one of the one or more displayed derived next states.

SUMMARY OF THE INVENTION

The foregoing and other problems are overcome and the objects of the invention are realized by a method for controlling a process, and by a user interface that is operated in accordance with the invention. The method includes the steps of (a) presenting a representation of a current state of a process; (b) deriving, from the current state of the process, one or more possible alternative states; (c) presenting a representation of the one or more derived possible alternative states; and, in response to a user selecting one of the representations of the one or more derived alternative states, (d) controlling the process to assume a new current state that corresponds to the derived alternative state that is associated with the selected representation.

In response to the user selecting the representation of the current state of the process, the method includes a step of accepting the current state.

An aspect of the invention relates to the perception of a controlled process from the point of view of the user. In accordance with the invention, the user is presented with an array of possibilities, each of which represents either the current state of the process or one or more possible next states that are derived from the current state. Each possibility may be graphically or otherwise presented to the user. The user selects from amongst the presented possibilities in order to cause the representation of the current state to more closely approximate a desired next state or a desired end state. The system and method of the invention operates to support the user by selecting actions required to bring about the convergence of the current state and the desired next or end state. The system and method also operates to refresh the array of possibilities, based on previous selections by the user and/or as a function of time. As a result, the total cognitive burden of the user is reduced to choosing amongst displayed alternatives until a satisfactory condition is achieved.

Preferably, the representations of the current state and the representations of the alternative states that are derived from the current state are arrayed on the display screen in a manner that supports the user's physical intuition concerning the process. In the context of this invention, "derived" refers to computer-generated predicted transformations. In an exemplary embodiment, the process is the aiming of a camera to obtain a self-portrait of the user. For this case, derived camera tilt images are disposed along a y-axis of the screen, derived camera pan images are disposed along an x-axis of the screen, and derived camera zoom images are disposed along an inferred z-axis, with a physically larger derived zoom-in image being positioned to appear "nearer" to the operator.

A user interface that is taught by the invention includes a process model unit, for predicting one or more allowable next states from a current state of a process, and a display processing unit for deriving, for each of the allowable next states, a representation of the allowable next state. The display processing unit has an output coupled to a display screen for displaying each of the representations in conjunction with a single representation of the current state of the process. The user interface further includes a process controller that is coupled to an input mechanism whereby a user selects one of the representations of one of the allowable next states. The process controller controls mechanisms embodying the controlled process in a manner that causes the process to enter a new current state that corresponds to the selected derived representation.

By example, the display screen has touchscreen capability whereby the user selects one of the representations by physically touching the display screen within an area associated with a selected one of the derived allowable states or the current state.

In the example above, selection of the current state has the effect of storing the portrate image. In general, selection of the current state has effects which are characterisitic of the particular process being controlled. These effects could, for example, include rendering the representation of the user in greater detail, or changing the representation from black and white to color.

BRIEF DESCRIPTION OF THE DRAWING

The above set forth and other features of the invention are made more apparent in the ensuing Detailed Description of the Invention when read in conjunction with the attached Drawing, wherein:

FIGS. 2a and 2b illustrate an operator display screen, for the exemplary process control system of FIG. 1, having a graphical display of a current system state and also a plurality of derived possible next states, wherein FIG. 2a shows the current state and a plurality of derived next states at a first instant in time, and wherein FIG. 2b shows the result of the selection of one of the derived next states of FIG. 2a;

DETAILED DESCRIPTION OF THE INVENTION

Figure 1:
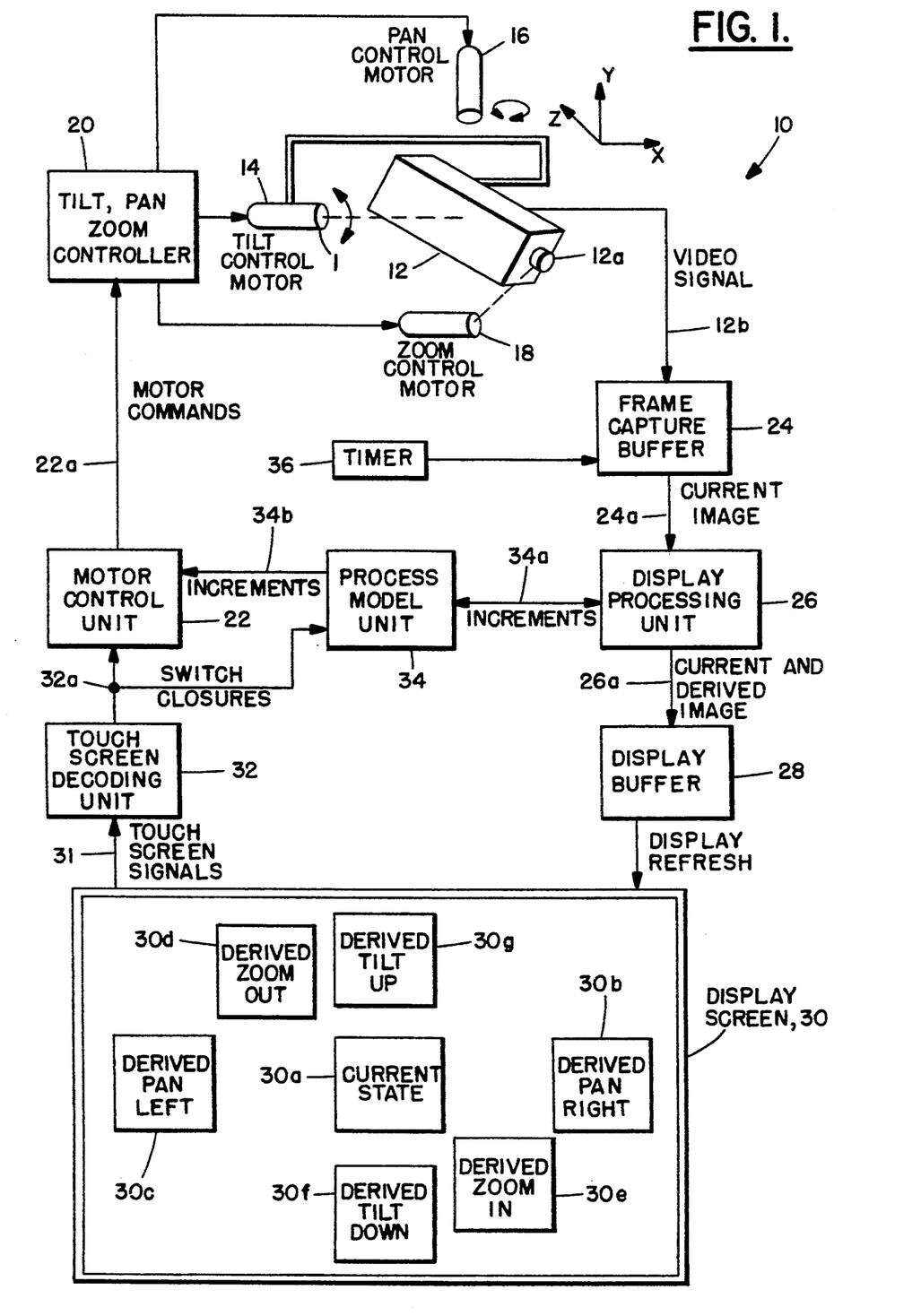
FIG. 1 is a block diagram of an exemplary process control system that is constructed and operated in accordance with the invention.

FIG. 1 is a block diagram of an exemplary process control system 10 that is constructed and operated in accordance with the invention. In FIG. 1 the process controls the pointing direction and the size of the field of view of a camera 12. However, and as will become apparent below, the illustrated embodiment is not intended to be read in a limiting sense upon the practice of the invention.

Camera 12 is gimbal-mounted and has an associated tilt control motor 14 for rotating the camera 12 around an x-axis, a pan control motor 16 for rotating the camera 12 around a y-axis, and a lens 12a zoom control motor 18 for providing an apparent translation along a z-axis. The zoom control motor 18 enables camera 12 zoom-in and zoom-out operations. Motors 14, 16, and 18 receive electrical command signals from a tilt, pan, and zoom controller 20, which in turn receives higher level motor commands from a motor control unit 22. By example, a given motor command generated by the motor control unit 22 may be one to change the pan angle by +3°. In response, the controller 20 interprets the motor command and generates an appropriate pan motor 16 actuation signal so as to pan the camera 12 by the specified amount.

The operation of the tilt, pan, zoom controller 20, and the attached motors 14, 16, and 18, is well known, and the operation of same will not be described in further detail.

Camera 12 provides a video output, or video signal 12b, to a frame capture buffer 24, also referred to in the art as a frame grabber. Frame capture buffer 24 includes a memory for storing digital information representing at least one full image frame that is generated by the camera 12. If the video signal 12b is provided in analog form, the the buffer 24 also includes an analog to digital converter for converting, prior to storage, the analog video signal to a digital signal. The frame capture buffer 24 provides the stored digital information as a current image 24a to a display processing unit 26.

In accordance with an aspect of the invention the display processing unit 26 operates generally to derive visual representations of one or more possible next process states from a current state of the process. For the illustrated embodiment, the display processing unit 26 derives a plurality of next camera image states from the current image 24a, and provides at an output the current image and the one or more derived camera images. This information is stored in a conventional display buffer 28, from where it is provided to a display screen 30 having graphical capability.

Figure 2A:
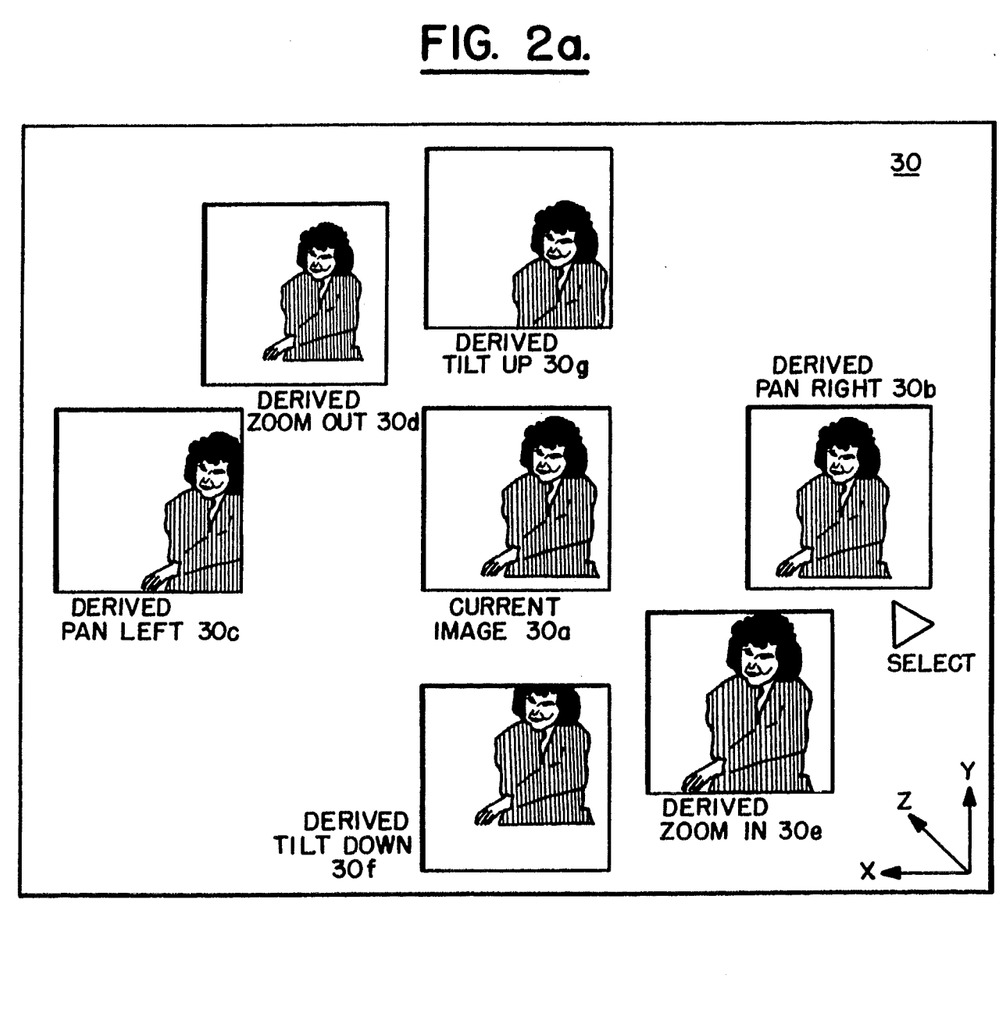
Figure 2B:
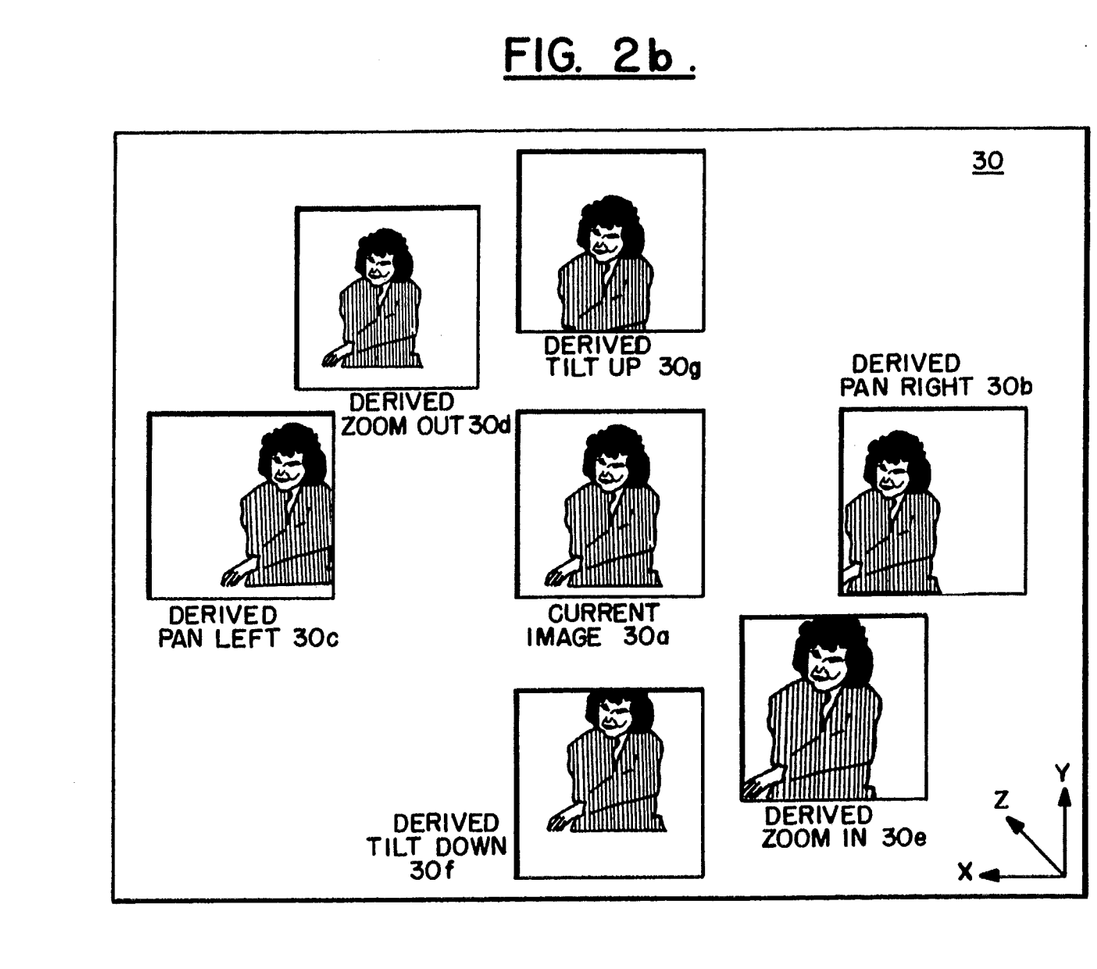

For the illustrated embodiment, and as is also shown in FIG. 2, the display screen 30 displays the current camera image state in a region 30a, a derived pan right state in a region 30b, a derived pan left state in a region 30c, a derived zoom-out state in a region 30d, a derived zoom-in state in a region 30e, a derived tilt down state in a region 30f, and a derived tilt up state in a region 30g. Displayed states 30b–30g are all derived from the current image state 30a, and display to the operator a result of the execution of the associated action. That is, each derived state 30b–30g displays what the current image state 30a will become if the associated derived state is selected by the operator for execution.

In the context of this invention, "derived" refers to computer-generated predicted transformations.

In this embodiment of the invention the display screen 30 has touchscreen capabilities. That is, each of the areas 30a–30g is defined and operated to have switching capabilities so that, in response to the operator physically touching one of the areas 30a–30g, touchscreen signals 31 are generated. The touchscreen signals 31 include x-y coordinate information that specify a location on the display screen 30 that was touched by the operator. The touchscreen signals 31 are provided to a touchscreen decoding unit 32. In the touchscreen decoding unit 32 the screen coordinates associated with each area 30a–30g are predetermined to encompass one of a plurality of specific touchscreen areas so that, in response to the touch screen signals 31, the touch screen control unit is enabled to identify which of the areas 30a–30g was touched by the operator. That is, the touch screen decoding unit 32 converts the touch screen signals 31 into a specific switch closure signal. For the illustrated embodiment the display screen 30 has seven (software generated) independent momentary-type switches associated therewith, corresponding to the areas 30a–30g.

In other unillustrated embodiments of the invention the touch screen capability may be replaced by, for example, a keyboard-driven cursor and/or a pointing device (mouse) cursor, whereby the operator is enabled to specify to the system 10 one of the areas 30a–30g. The specific implementation of the operator input function is thus not germane to the understanding of, or the operation of, the invention. That is, other methods for selection, such as voice recognition, light pen, etc., may occur to those skilled in the art.

Reference is now made to FIGS. 2a and 2b for illustrating the display screen 30 for the exemplary process control system of FIG. 1. In this example the subject that is imaged by the camera 12 is the operator of the system 10, as in done in a self-portrait booth (kiosk). As a result, the system 10 may also include a printer or other suitable device for producing a hard copy of the camera image, after the camera 12 is correctly positioned with respect to the subject being imaged. Other means may be provided for storing and/or for transmitting the image for later use.

This self-portrait application particularly emphasizes the utility of the invention. Conventional self-portrait techniques suffer from problems resulting from large differences in height between subjects and a lack of a suitable feedback mechanism for determining where the camera is aimed. These problems have become more apparent in that there is a developing class of computer applications wherein self-portraits or pictures of the participants are an integral part of the application. These applications include, but are not limited to, security systems, multi-media applications, and teleconferencing systems.

In accordance with the invention the area 30a displays the current image of the subject. Areas 30b–30g each display an image that is derived from the current image 30a, and present to the operator an image of a next possible state of the current image.

Preferably, the current and derived images are arrayed on the display screen 30 in a manner that supports the user's physical intuition concerning the process, in this case the movement of the camera. That is, the derived tilt areas 30g and 30f are disposed along a y-axis of the screen, the derived pan areas 30b and 30c are disposed along an x-axis of the screen, and the derived zoom areas 30d and 30e are disposed along an inferred z-axis, with the physically larger derived zoom-in image area 30e being positioned to appear "nearer" to the operator.

In operation, the operator touches or otherwise selects one of the areas 30b–30g. In response, the camera 12 is repositioned accordingly, and the current image 30a reflects the result of the repositioning operation. Furthermore, each of the derived images displayed in the areas 30b–30g is updated in accordance with the new current image, and also at regular intervals of time. For example, the derived pan right image area 30b is updated to reflect the result of a pan right operation, based on the current updated image 30a. This process continues until the current image 30a meets a criteria applied by the operator. At this point, the operator selects the current image area 30a, and the current image 30a is stored and/or is printed out.

In FIG. 2a the operator selects the derived pan right image 30b to better center the image presented in the current image area 30a. In response, the camera 12 is repositioned by a current pan right increment, resulting in the capture and display of a new current image in the area 30a in FIG. 2a. The images presented in areas 30b–30g are all derived from the new current image, and present possible alternative next states for the imaging process.

Further in accordance with the invention each of the derived next states is quantizised. That is, each next state is derived so as to be within a predetermined distance from the current state. For the example of FIG. 2, the pan right and pan left derived next states are a predetermined angular displacement about the y-axis from the current state, and the derived tilt down and the tilt up next states are a predetermined angular displacement about the x-axis. Similarly, the derived zoom-out and zoom-in next states are a predetermined linear distance along the z-axis.

Figure 3:
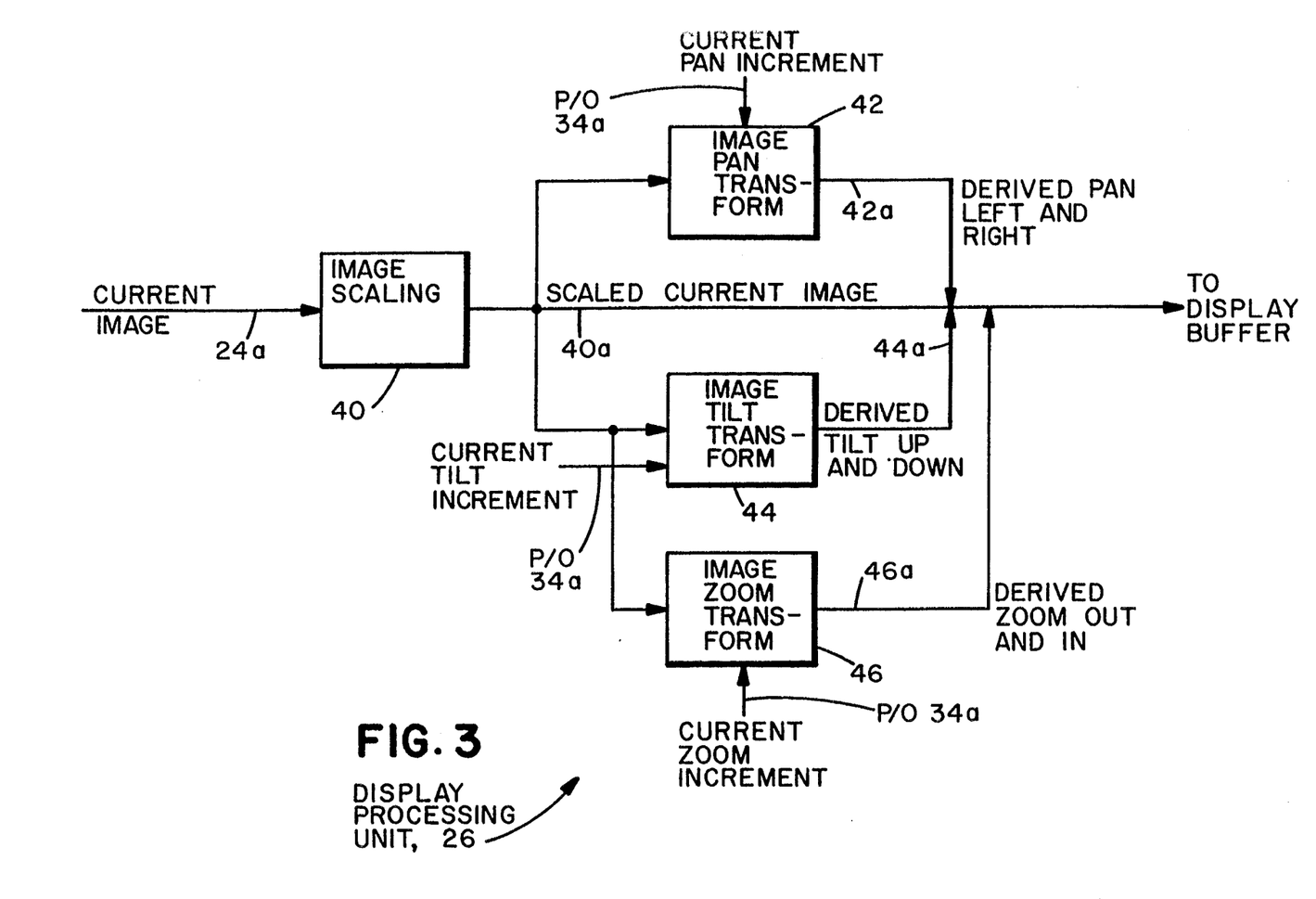
FIG. 3 is block diagram that shows in greater detail the display processing unit of FIG. 1.

Referring again to FIG. 1, the information relating to the derived next state quantization factors is maintained by a process model unit 34. The process model unit 34 is coupled to the display processing unit 26, as is also seen in FIG. 3, for providing quantization factors (current increments) thereto. The process model unit 34 is also coupled to the motor control unit 22 for providing the quantization factors thereto.

In general, the process model unit 34 is responsible for predicting the allowed next states, for providing the information required by the display processing unit 26 to derive the appearance of those states, and for providing the information required by the motor control unit 22 to position the camera to achieve a state having the appearance of a selected one of the derived states.

As seen in FIG. 3, the display processing unit 26 receives the current image 24a. The current image 24a is applied to a scaling block 40 wherein the current image 24a is reduced to a size compatible with the current image area 30a (FIG. 2). The output of the image scaling block 40 is the scaled current image 40a. The scaled current image 40a is applied to the display buffer 28 for display within the current image area 30a, and is also applied to an image pan transformation block 42, an image tilt transformation block 44, and an image zoom transformation block 46. Blocks 42, 44, and 46 each apply a predetermined image transformation function to the scaled current image 40a, in accordance with an associated current pan increment, a current tilt increment, and a current zoom increment, respectively. The current increments are received from the process model unit 34. The operation of blocks 42, 44, and 46 generates the derived next states of the scaled current image 40a for display in the areas 30b–30g of the display screen 30.

By example, image pan transformation block 42 horizontally shifts the scaled current image 40a by a number of pixels that correspond to an angular displacement that is specified by the current pan increment. The image tilt transformation block 44 vertically shifts the scaled current image 40a by a number of pixels that correspond to an angular displacement that is specified by the current tilt increment. The image zoom transformation block 46 applies both a pixel expansion and contraction operation to the scaled current image 40a to generate the derived zoom-in state and the derived zoom-out state, respectively. The amount of pixel expansion and contraction is specified by the current zoom increment signal.

Figure 4:
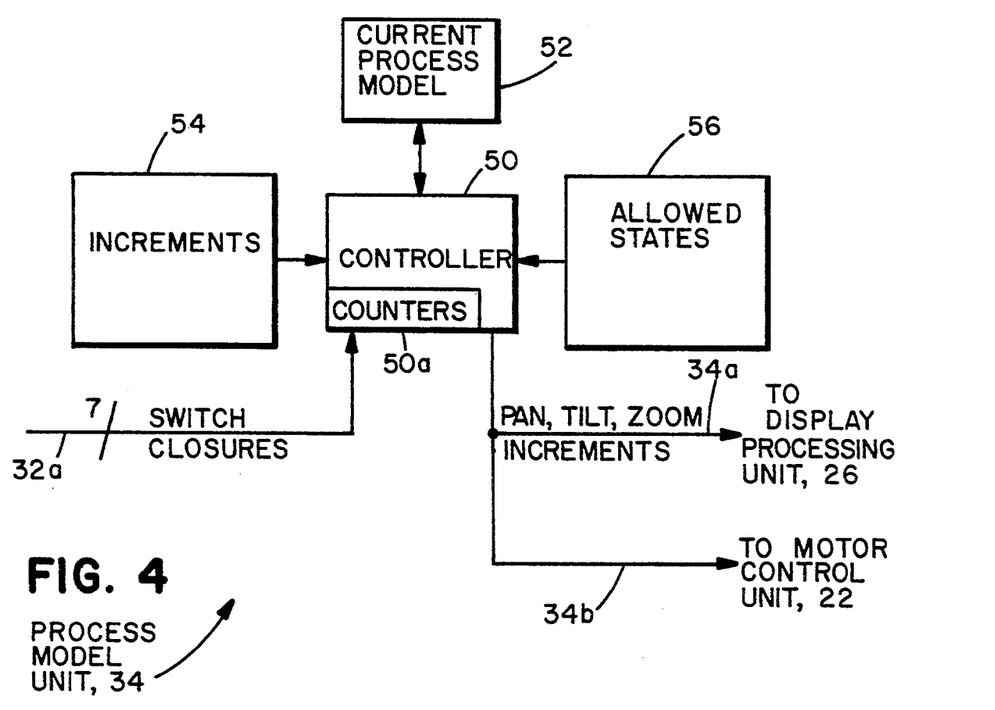
FIG. 4 is a block diagram which shows in greater detail the display model unit of FIG. 1.

FIG. 4 is a block diagram that illustrates the process model unit 34. The process model unit 34 includes a controller 50 that receives switch closure information 32a from the touchscreen decoding unit 32. The switch closure information 32a is representative of the operator touching the display screen 30 in one of the areas 30a–30g. Controller 50 includes a plurality of counters 50a for counting a number of switch closures for each of the regions 30b–30g. The use of the counters 50a enables different increments to be employed as a function of a number of switch closures for a particular touchscreen switch. For example, for the first three pan left and pan right switch closures a first pan increment resolution may be employed (5°), and for succeeding pan left and pan right switch closures a second, finer increment resolution may be employed (2°). A further predetermined number of depressions of an individual image state touchscreen switch may be employed to reset the increment to the larger value, as repeated depressions may indicate that the user is attempting to make a large change in image aspect or position.

A depression of the switch associated with the current image area 30a may be employed to reset the counters 50a associated with the pan, tilt, and zoom touchscreen switches, and to otherwise reinitialize the system 10.

Bidirectionally coupled to controller 50 is a current process model 52 that is maintained by the controller 50 in response to switch closure information. The current process model 52 represents the current angular orientation of the camera 12 in the pan and tilt axes, and also represents the current zoom setting. The use of the current process model 52, in conjunction with an allowed states block 56, enables the controller 50 to control the display processing unit 26 to derive and display only allowable next states for the process. For example, if it is known that an obstruction would prevent the camera 12 from moving in the tilt axis past a predetermined point, the controller 50 sets the tilt increment to zero when the current process model 52 indicates that the camera has reached the predetermined point. The result is that the display processing unit 26 does not generate a derived next state (in tilt up for example) that would enable the operator to drive the camera into the obstruction.

Also coupled to the controller 50 is a list of increments for pan, tilt, and zoom. If a constant increment is employed then each of the predetermined increments 54 is a constant, and the counters 50a may be dispensed with. However, if it is desired to apply different increments then the increments block 54 is accessed by the controller 50 to obtain a current increment, as a function of the count of the associated counter 50a and the current process model 52.

Figure 5:
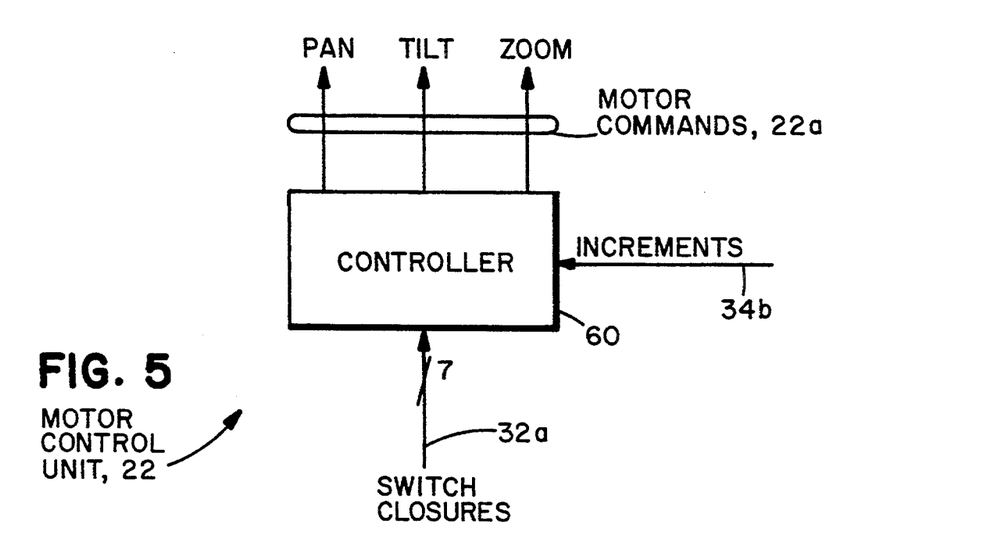
FIG. 5 is a block diagram which shows in greater detail the motor control unit of FIG. 1.

FIG. 5 shows in greater detail the motor control unit 22. Motor control unit 22 includes a controller 60 that receives the switch closure information 32a and also current increments 34b from the process model unit 34. Controller 60 translates a particular switch closure, such as pan right, in accordance with a current pan right increment, and generates a corresponding pan motor command to the tilt, pan, zoom controller 20 of FIG. 1. The switch closure for the current image state area 30a may be employed by the controller 60 to reset the camera 12 to a predetermined initial orientation.

Figure 6:
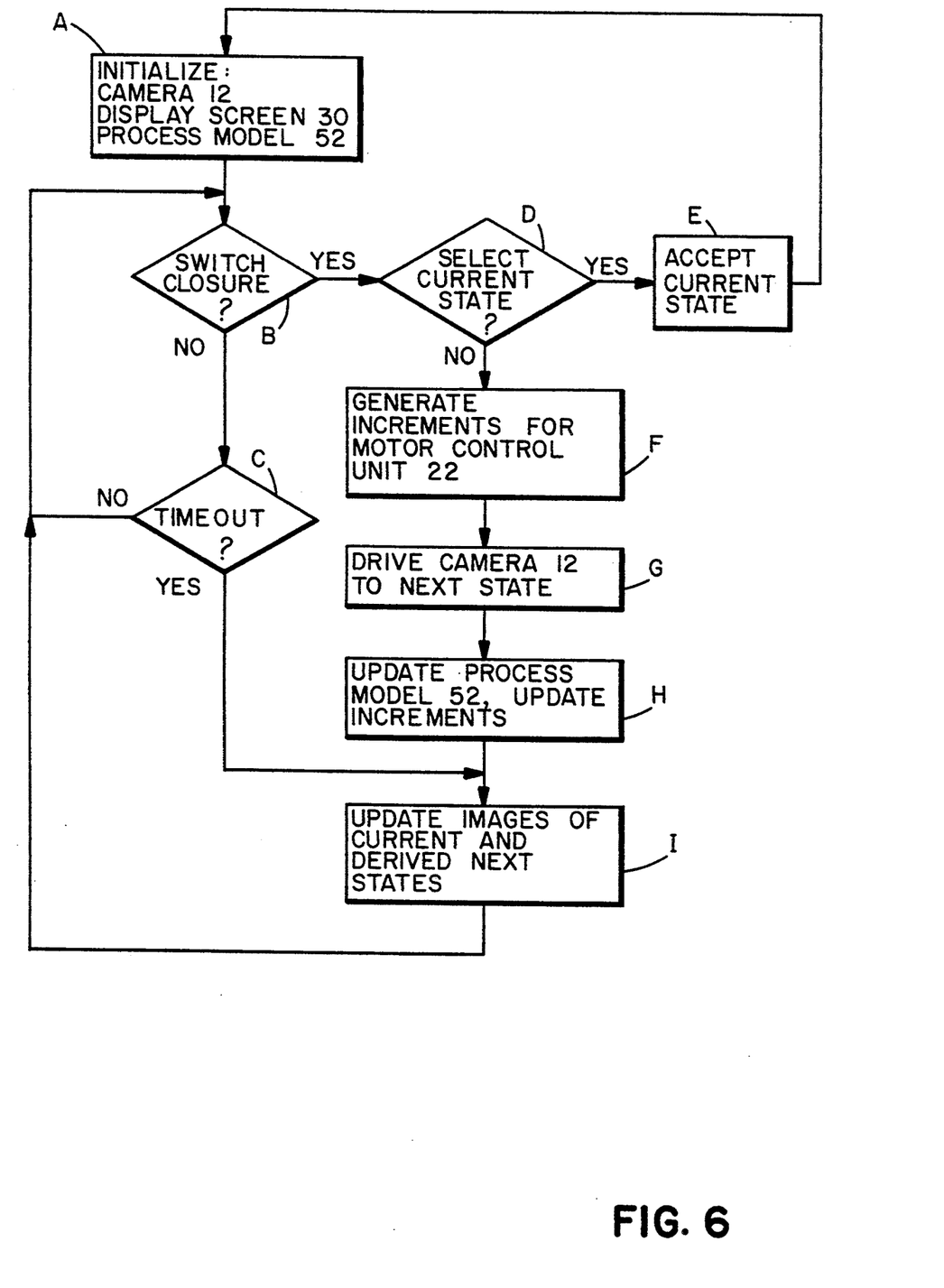
FIG. 6 is a flow chart that illustrates a method of the invention.

FIG. 6 is a flow chart that illustrates the operation of the method of the invention for the embodiment of FIGS. 1–5. At Block A the camera 12 position and process model 52 are initialized. The display screen 30 is thus also initialized with a current image state 30a and a corresponding plurality of derived image states 30b–30g. At Block B a determination is made if the operator has caused a switch closure. If NO, a determination is made at Block C if a timer 36 (FIG. 1) has generated a timing pulse. Timer 36 is provided to cause the frame capture buffer 24 to capture a new image at regular intervals so as to update the representations of the current image, and the derived images. This enables the current image area 30a and the derived image areas 30b–30g to accurately reflect changes in position and facial expression of the operator. If NO at Block C, the method continues at Block B.

If YES at Block B, a determination is made at Block D if the operator has made a switch closure for a desired one of the derived states 30b–30g, or for the current image state 30a. If the switch closure is for the current state 30a, the YES branch is taken and the method continues at Block E where the current image state 30a is accepted. That is, the current image may be stored, and/or converted to a tangible form, and/or transmitted to a remote location. The method then returns to Block A.

In general, the action of accepting the current state initiates an accept-specific sequence of operations. By example, to achieve a rapid derivation of next states, and the display of same, the captured and the derived video may be manipulated and displayed as a black and white image. Upon the occurence of an accept action by the operator, the image appearing in the current state area 30a, and optionally the next state areas 30b–30g, may be converted to color. Upon a further accept action by the operator, the accepted current state color image may be printed, stored, transmitted, or otherwise acted upon. As such, it should be realized that the action of accepting the current state need not terminate the process being performed.

If NO at Block D the switch closure is acted upon by the process model unit 34 which generates an appropriate set of pan, tilt, and zoom increments 34a and 34b (Block F). In response to the updated increments 34b the motor control unit 22 generates an appropriate motor command 22a for driving the camera 12 to a position that corresponds to the selected derived next state (Block G), and process model 52 is updated to reflect the new camera 12 orientation (Block H).

The action of Block G causes a change in the current image 24a which is processed by the display processing unit 26 to update the display current image 30a and, in conjunction with the updated increments 34a, to update the derived next states 30b–30g (Block I). The method then continues at Block B to process the next switch closure from the operator.

If at Block C a timeout condition is detected, the frame capture buffer 24 is automatically updated to capture and store a new frame of video information. This causes a change in the current image 24a which is processed by the display processing unit 26 to update the display current image 30a and, in conjunction with a current set of increments 34a, to update the derived next states 30b–30g (Block I). The method then continues at Block B to process the next switch closure from the operator.

Although described in the context of a video camera control system, it should be realized that the teaching of the invention is also applicable to, by example, controlling the movement of an antenna or a robotic manipulator. The teaching of the invention is also applicable to, by example, a game playing system such as chess. For example, block 30a displays an image that shows a current state of the game pieces, while each of the derived next states displays the game board after one of a number of possible allowable next moves, based on the current positions of the user's game pieces. By selecting one of the derived next states, the system moves the user's game piece accordingly and, in response to the opponent's move, generates a plurality of updated derived next states. The updated derived next states are displayed to the user, in conjunction with the updated current state, so that the user is enabled to select a next move. Selecting the current state may indicate that the user wishes to concede the game.

For this latter embodiment, the model unit 34 includes a chess rules data base for updating the current process model 52, and also may include a filter for selecting (n) best derived next states from the potentially large number of possible derived next states. The filter criteria may be a score associated with each derived next state (move). Also for this latter embodiment, the predetermined increments 54 may be set to one for deriving only next moves, or may be set to two or more for deriving next moves to a depth of two or more. The increments are provided to a processing unit that corresponds to the display processing unit 26 where the derived next move images of the game board are derived. For this embodiment, the current process model 52 represents the current state of the game pieces and is thus also supplied to the processing unit for display.

As in the case illustrated in FIGS. 2a and 2b, the display screen 30 may be organized so as to support the user's intuition of the process, such as by displaying, for each derived next state, the region of the chess board from which the game piece would be moved.

It should thus be clear that the method of the invention may be applied with benefit to any process control application wherein there are one or more possible next states of a process that arise from a current state of the process.

An important aspect of the invention relates to the perception of the controlled process from the point of view of the user. In accordance with the teaching of the invention, the user is presented with an array of possibilities, each of which represents either the current state of the process or one or more possible next states that are derived from the current state. Each possibility may be graphically represented to the user, although other sensory presentations are also within the scope of the invention. For example, each of a plurality of next states may be presented in an auditory or a tactile manner to the user. Mixed sensory presentations are also within the scope of the invention. In all cases, however, the user selects from amongst the presented possibilities in order to make the representation of the current state more closely approximate a desired end state. The system and method of the invention operates to support the user by selecting actions required to bring about the convergence of the current state and the desired end state. The system and method also operates to refresh the array of possibilities, based on previous selections by the user and/or as a function of time. As a result, the total cognitive burden of the user is reduced to choosing amongst presented courses of action, and to observing the effect of a chosen course of action upon the process being controlled.

In systems in which the actions of controls are unfamiliar, complex, or have combinatorial spaces which are very large, the method of the invention prevents accidents and errors of oversight. In any system it permits the user to remain focussed on goals, as opposed to the mechanics of an underlying process for achieving those goals.

It should be realized that the teaching of the invention is amenable to expression in a wide variety of embodiments, other than those expressly set forth above. By example, the display of the current state and the derived next states need not be static. That is, a railroad traffic control system may show for next states a train travelling faster or slower. In an air traffic control system, the system may show a current traffic pattern and, for derived next states, a number of different traffic patterns for a plurality of aircraft flying at different airspeeds and altitudes.

Thus, while the invention has been particularly shown and described with respect to a presently preferred embodiment thereof, it will be understood by those skilled in the art that changes in form and details may be made therein without departing from the scope and spirit of the invention.

Having thus described our invention, what we claim as new, and desire to secure by Letters Patent is:

1. A method for controlling a process, comprising the steps of:
    (a) presenting a representation of a current state of a process;
    (b) deriving in accordance with a predetermined transformation, from the current state of the process, one or more alternative states each representing a possible future state of the process that may be entered directly or indirectly from the current state, wherein each of the one or more derived alternative states of the process is not predetermined but is instead made manifest only as a result of executing the step of deriving;
    (c) presenting a representation of the one or more derived alternative states; and
    in response to a selection of one of the representations of the one or more derived alternative states,
    (d) controlling the process to assume a new current state that corresponds to the derived alternative state that is associated with the selected representation.

2. A method as set forth in claim 1 wherein the representation of the current state of the process is also selectable and, in response to the selection of the representation of the current state of the process, further including a step of initiating a current state accept-specific sequence of actions.

3. A method as set forth in claim 1 wherein the step of controlling includes a step of energizing an actuator means to drive the process into the new current state.

4. A method as set forth in claim 3 wherein the step of energizing the actuator means energizes the actuator means to drive the process by a predetermined increment.

5. A method as set forth in claim 1 wherein the step of controlling includes a step of updating a model of the process to reflect an assumption of the new current state.

6. A method as set forth in claim 1 wherein the step of deriving derives the one or more alternative states in accordance with a predetermined increment.

7. A method as set forth in claim 5 wherein the step of controlling includes a step of updating the increment for use in deriving one or more alternative states from the new current state.

8. A method as set forth in claim 1 and further including the steps of:
periodically updating the current state of the process;
presenting a representation of the updated current state of the process;
deriving in accordance with the predetermined transformation, from the updated current state of the process, one or more alternative states each representing a possible future state of the process that may be entered directly or indirectly from the updated current state; and
presenting a representation of the one or more alternative states that are derived from the updated current state.

9. A method as set forth in claim 1 wherein the step of presenting a representation of a current state of a process, and the step of presenting a representation of the one or more derived alternative states, presents the representations in such a manner as to support a user's physical intuition concerning the process.

10. A method as set forth in claim 1 wherein the presentations are presented on display means that includes a display screen having touchscreen capability, and wherein a user selects one of the representations of the one or more derived alternative states by physically touching the display screen within an area associated with the selected one of the derived alternative states.

11. A method as set forth in claim 1, wherein the steps (a), (b), (c), and (d) are repeated until the representation of the current state of the process is selected.

12. A method for controlling a process, comprising the steps of:
(a) presenting a presentation of a current state of a process;
(b) deriving, from the current state of the process, one or more alternative states;
(c) presenting a representation of the one or more derived alternative states; and
in response to a selection of one of the representations of the one or more derived alternative states,
(d) controlling the process to assume a new current state that corresponds to the derived alternative state that is associated with the selected representation, wherein the process controls the positioning of a camera along or about one or more axes.

13. A method for controlling a process, comprising the steps of:
(a) presenting a representation of a current state of a process;
(b) deriving, from the current state of the process, one or more alternative states;
(c) presenting a representation of the one or more derived alternative states; and
in response to a selection of one of the representations of the one or more derived alternative states,
(d) controlling the process to assume a new current state that corresponds to the derived alternative state that is associated with the selected representation, wherein the representation of the current state of the process is an image obtained by a camera at a current location, and wherein the representations of the one or more derived alternative states are each an image that would be obtained by the camera if the camera were translated, from the current position, about or along an axis.

14. A method for controlling a camera, comprising the steps of:
(a) presenting with a display means a representation of a current image obtained by the camera;
(b) deriving, from the current image, one or more alternative images that would be obtained by the camera if the camera were translated about or along an axis;
(c) presenting with the display means a representation of the one or more derived alternative images; and
in response to a user selecting one of the representations of the one or more derived alternative images,
(d) translating the camera to a position where the camera obtains a new current image that corresponds to the derived alternative image that is associated with the selected representation.

15. A method as set forth in claim 14 wherein derived alternative images include images that would be obtained if a pan angle of the camera were changed and if a tilt angle of the camera were changed.

16. A method as set forth in claim 15 wherein derived alternative images further include images that would be obtained if a camera zoom function were changed.

17. A method as set forth in claim 14 wherein each of the derived alternative images is derived so as to be located within an associated predetermined increment of camera displacement away from a current camera position.

18. A method as set forth in claim 17 wherein the step of translating includes a step of updating a model of the camera orientation to reflect the translation, and a step of updating, if required, one or more of the predetermined camera displacement increments.

19. A method as set forth in claim 18 wherein the step of updating the one or more predetermined camera displacement increments includes an initial step of determining, based on the updated model and on one or more predetermined allowed camera states, if a further translation of the camera would result in the camera entering a disallowed state.

20. A method as set forth in claim 14 wherein the steps (a) and (c) of displaying display the representations in such a manner as to support a user's physical intuition concerning the control of the camera.

21. A method as set forth in claim 14 wherein the display means includes a display screen having touchscreen capability, and wherein the user selects one of the displayed representations by physically touching the display screen within an area associated with the selected one of the derived alternative images.

22. A method as set forth in claim 14 and, in response to the user selecting the representation of the current image, further including a step of initiating an accept-specific sequence of actions for accepting the current image.

23. A method as set forth in claim 14 and, in response to the user selecting the representation of the current image, further including a step of accepting the current image by reproducing the current image in a tangible form, and/or storing the current image for later reference, and/or transmitting the current image to a remote location.

24. A user interface for a process control system, comprising:
   means for deriving in accordance with a predetermined transformation, from a current state of the process, one or more alternative states each representing a possible future state of the process that may be entered directly or indirectly from the current state, wherein each of the one or more derived alternative states of the process is not predetermined but is instead made manifest only as a result of an operation of said means for deriving;
   means for presenting a representation of the current state of the process and for presenting a representation of the one or more derived alternative states; and
   control means, responsive to a user selecting one of the representations of the one or more derived alternative states, for controlling the process to assume a new current state that corresponds to the derived alternative state that is associated with the selected representation.

25. A user interface as set forth in claim 24 wherein said control means is responsive to the user selecting the representation of the current state of the process, for initiating a current state accept-specific sequence of operations.

26. A user interface as set forth in claim 24 wherein said control means includes actuator means for driving the process into the new current state.

27. A user interface as forth in claim 24 wherein said control means includes means for storing and updating a model of the process to reflect an assumption of the new current state.

28. A user interface as set forth in claim 24 wherein said deriving means includes means for deriving the one or more alternative states in accordance with a predetermined increment, and wherein said predetermined increment is generated by said control means.

29. A user interface as set forth in claim 24 wherein said presenting means presents the representations in such a manner as to support a user's physical intuition concerning the process.

30. A user interface as set forth in claim 24 wherein said presenting means includes a display screen, and wherein the user selects one of the representations of the one or more derived alternative states by physically touching the display screen to specify one of the derived alternative states, or by otherwise specifying one of the derived alternative states.

31. A user interface comprising:
   process model means for predicting in accordance with a predetermined transformation one or more allowable future states of a process from a current state of the process, each of the predicted one or more future states, representing a future state of the process that may be entered directly or indirectly from the current state, wherein each of the predicted one or more future states of the process is not predetermined but is instead made manifest only as a result of an operation of said process model means;
   display processing means, having an input coupled to an output of said process model means, for deriving, for each of the predicted allowable future states, a representation of said predicted allowable future state, said display processing means having an output coupled to display means for displaying each of said derived representations in conjunction with a representation of the current state of the process; and
   control means, having a first input coupled to an output of said process model means and a second input coupled to a means whereby a user selects one of said derived representations of one of said predicted allowable future states, for controlling the process to enter a new current state that corresponds to the selected derived representation.

32. A user interface as set forth in claim 31 wherein said display means includes a display screen having touchscreen capability, and wherein the user selects one of the derived representations of the one or more predicted allowable future states by physically touching the display screen within an area associated with the selected one of the derived representations.

33. A user interface as set forth in claim 31 wherein said display means includes a display screen, and further including means for use by the user for specifying one of the derived representations of the one or more predicted allowable future states to select one of the predicted allowable future states.

34. A user interface as set forth in claim 31 wherein said display means displays the derived representations in such a manner as to support a user's physical intuition concerning the process.

35. A user interface for use with a video image capture means, comprising: display means having a display screen, said display screen displaying in a first region a representation of a captured video signal, said display screen displaying in a second region a transformed representation of said captured video signal;
   video image transform means, having an input for receiving the captured video signal, for generating said transformed representation from the captured video signal, the transformed representation being generated to represent a video image that would be obtained from a predetermined allowable future state of the video image capture means; and
   means for specifying to said user interface either the first region or the second region so as to select the representation of the captured video signal, or to cause the video image capture means to enter the predetermined allowable future state, respectively.

36. A method for controlling a process, comprising the steps of:
   (a) presenting a representation of a current state of a process;
   (b) deriving, from the current state of the process, one or more alternative states, wherein each of the one or more derived alternative states of the process is not predetermined but is instead made manifest only as a result of executing the step of deriving;
   (c) presenting a representation of the one or more derived alternative states; and
   in response to a selection of one of the representations of the one or more derived alternative states,
   (d) controlling the process to assume a new current state that corresponds to the derived alternative state that is associated with the selected representation, wherein the process controls the movement of one or more physical objects within a space defined by a coordinate system.

37. A method for controlling a process, comprising the steps of:
(a) presenting a representation of a current state of a process;
(b) deriving, from the current state of the process, one or more alternative states, wherein each of the one or more derived alternative states of the process is not predetermined but is instead made manifest only as a result of executing the step of deriving;
(c) presenting a representation of the one or more derived alternative states; and
in response to a selection of one of the representations of the one or more derived alternative states,
(d) controlling the process to assume a new current state that corresponds to the derived alternative state that is associated with the selected representation, wherein the process controls the orientation of one or more physical objects within a space defined by a coordinate system.

* * * * *